(12) United States Patent
Chen (10) Patent No.: US 9,822,865 B2
(45) Date of Patent: Nov. 21, 2017

(54) BICYCLE HUB AND FLYWHEEL STRUCTURE

(71) Applicant: Ching-Shu Chen, Changhua (TW)

(72) Inventor: Ching-Shu Chen, Changhua (TW)

(73) Assignee: Chosen Co. Ltd., Changhua (TW)

( * ) Notice: Subject to any disclaimer, the term of this patent is extended or adjusted under 35 U.S.C. 154(b) by 190 days.

(21) Appl. No.: 14/804,202

(22) Filed: Jul. 20, 2015

(65) Prior Publication Data

US 2017/0021667 A1   Jan. 26, 2017

(51) Int. Cl.
| | | |
|---|---|---|
| *F16H 55/12* | (2006.01) | |
| *B60B 27/00* | (2006.01) | |
| *B60B 27/02* | (2006.01) | |
| *B60B 27/04* | (2006.01) | |
| *B62M 9/121* | (2010.01) | |

(52) U.S. Cl.
CPC ......... *F16H 55/12* (2013.01); *B60B 27/0026* (2013.01); *B60B 27/023* (2013.01); *B60B 27/047* (2013.01); *B62M 9/121* (2013.01); *B60B 2900/531* (2013.01); *B60B 2900/541* (2013.01)

(58) Field of Classification Search
CPC . B62M 9/10; B62M 9/12; F16H 55/30; F16D 41/24; B60B 27/023; B60B 27/04; B60B 27/047
See application file for complete search history.

(56) References Cited

U.S. PATENT DOCUMENTS

| | | | | |
|---|---|---|---|---|
| 5,480,357 A | * | 1/1996 | Liang | B62M 9/10 474/160 |
| 7,011,592 B2 | * | 3/2006 | Shahana | B62M 9/10 474/152 |
| 7,351,171 B2 | * | 4/2008 | Kanehisa | B60B 27/026 474/160 |
| 2001/0039224 A1 | * | 11/2001 | Lim | F16D 41/30 474/160 |
| 2005/0009654 A1 | * | 1/2005 | Kanehisa | B60B 27/026 474/152 |
| 2012/0322598 A1 | * | 12/2012 | Lin | B62M 9/10 474/160 |
| 2013/0017914 A1 | * | 1/2013 | Braedt | B62M 9/10 474/160 |
| 2016/0083045 A1 | * | 3/2016 | Lin | F16H 55/30 474/160 |

* cited by examiner

*Primary Examiner* — Jason R Bellinger
(74) *Attorney, Agent, or Firm* — Che-Yang Chen; Law Offices of Scott Warmuth (57) ABSTRACT

An improved wheel hub may include a hub body, a freewheel unit, a connecting sleeve and an external freewheel. The connecting sleeve connects to the ratchet sleeve of the hub body in order to provide more space for the external freewheel. With the design of the connecting sleeve and the external freewheel unit, the hub body loaded with more smaller freewheels provides more pedaling speeds for a bicycle travelling downhill. When cycling downhill by using the smaller diameters of the sprockets, the smaller sprockets of the external freewheel can help a cyclist to maintain an optimum pedaling speed in a slopy terrain, and the speed of the bicycle can be easily controlled.

8 Claims, 7 Drawing Sheets

BICYCLE HUB AND FLYWHEEL STRUCTURE

FIELD OF THE INVENTION

The present invention relates to a bicycle hub and flywheel structure, and more particularly to a bicycle hub and flywheel structure that can be used for a bicycle travelling downhill.

BACKGROUND OF THE INVENTION

Generally, most bicycles have a derailleur system which can force the chain to shift between different sprockets in order to achieve a variable gear ratio, so a cyclist can maintain an optimum pedaling speed while covering varied terrain. A conventional bicycle hub apparatus includes a freewheel, a sprocket unit, a derailleur, a chain, a shift lever and a cable. The sprocket unit includes two to three pieces of sprockets formed on a crank portion of a bicycle, and the chain engaged on one of the sprocket of the sprocket unit is shifted between sprockets by operating the shift lever. The freewheel includes five to ten pieces of sprockets mounted on the hub of rear bicycle wheel, and the chain engaged on one of the sprockets of freewheel is shifted between sprockets by the shift lever. The power is generated by rotating the crank and is transmitted to the rear wheel by the chain. By arranging different gear ratio, the bicycle can achieve different pedaling speeds.

Figure 7:
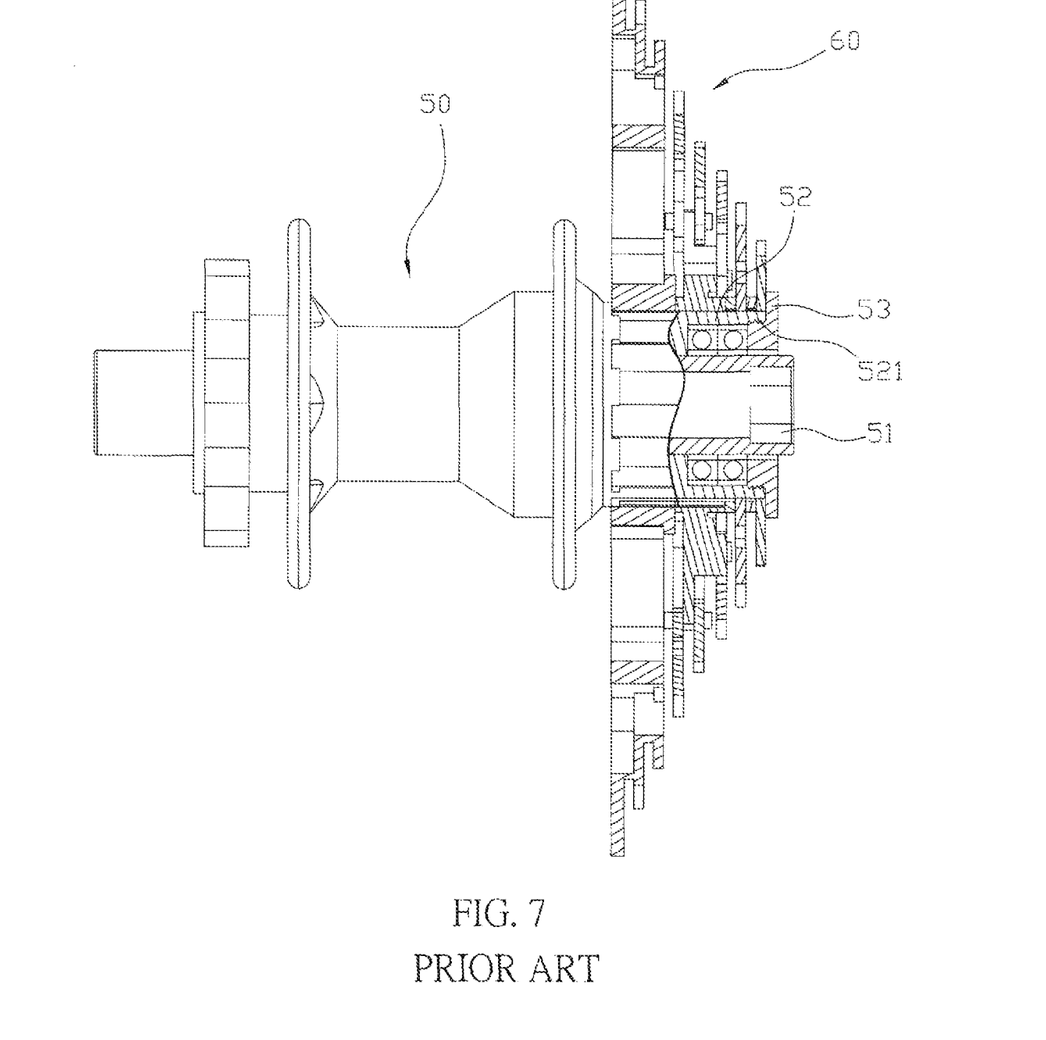
FIG. 7 is a prior art.

Referring to FIGS. 7 and 8, the conventional bicycle hub apparatus comprises a hub body (50) with a shaft (51), and a ratchet sleeve (52) is mounted on the shaft (51) in order to secure the position of a freewheel unit (60). The freewheel unit (60) driven by the ratchet sleeve (52) is engaged with an outside periphery of the ratchet sleeve (52). A threaded segment (521) is formed at an inner periphery of the ratchet sleeve (52), and a nut (53) fastened on the threaded segment (521) is borne against the freewheel unit (60), so that the freewheel (60) is secured on the ratchet sleeve (52). Then a cyclist can shift the chain to engage with different sprockets by the shift lever in order to achieve the different pedaling speeds.

However, the conventional bicycle hub apparatus is disadvantageous because: (i) on the market, the number and the minimum size of sprockets on the freewheel (60) is limited by the size of the ratchet sleeve (52). When cycling downhill, the conventional minimum sprocket can only provide the pedaling speed for a slightly slopy terrain, and the speed of the bicycle is difficult to control when the slope of the terrain increases, so the risk of bicycle chain falling off is increased; and (ii) the acceleration of the bicycle by rotating the pedals is limited while the size of minimum sprocket is restricted, and the problem can only be solved by developing a suitable ratchet sleeve (52) which can fit the smaller sprockets. However, the solution mentioned above increases the costs of production and research and development. Therefore, there remains a need for a new and improved design for a bicycle hub apparatus to overcome the problems presented above.

SUMMARY OF THE INVENTION

The present invention provides a bicycle hub and flywheel structure, which comprises a hub body, a freewheel unit, a connecting sleeve and an external freewheel. The hub body comprises a shaft, and a ratchet sleeve is mounted on the shaft in order to fix the position of the freewheel unit. A plurality of axial connecting grooves are formed on an outer periphery of the ratchet sleeve, and an inner threaded segment is formed on an inner periphery thereof. The connecting sleeve having a first through hole for penetration is mounted on the shaft, and a connecting portion comprising a threaded segment at one end thereof is engaged with the ratchet sleeve. A through portion is formed beside the connecting portion, and an outer diameter thereof is smaller than the connecting portion, and an outer threaded segment is formed on an outer periphery thereof for fastening by a nut. An external freewheel unit comprises a plurality of external sprockets in descending order of size, and a second through hole formed on a central portion thereof is mounted on the connecting sleeve. The largest sprocket of the external freewheel unit is smaller than an outer diameter of the smallest sprocket of the freewheel unit, and a plurality of restricting ribs are formed on a backside of the largest sprocket corresponding to the connecting grooves of the ratchet sleeve.

Comparing with conventional bicycle hub apparatus, the present invention is advantageous because: (i) the connecting sleeve connects to the ratchet sleeve of the hub body in order to provide more space for the external freewheel, and is suitable for most hub bodies on the market, and the assembly and disassembly process of the freewheel unit and the external freewheel unit are easy and fast; and (ii) by the design of the connecting sleeve and the external freewheel unit, the hub body loaded with more smaller freewheels provides more pedaling speeds for a downhill bicycle. The number of the smaller sprockets is increased, and the number of teeth on minimum sprocket is decreased while the sprocket becomes smaller. When cycling downhill, by using the smaller diameters of the sprockets, the smaller sprockets of the external freewheel can help a cyclist to maintain an optimum pedaling speed in a slopy terrain, and the speed of the bicycle is easy to control when the slope of the terrain increases to reduce the risk of bicycle chain falling off.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
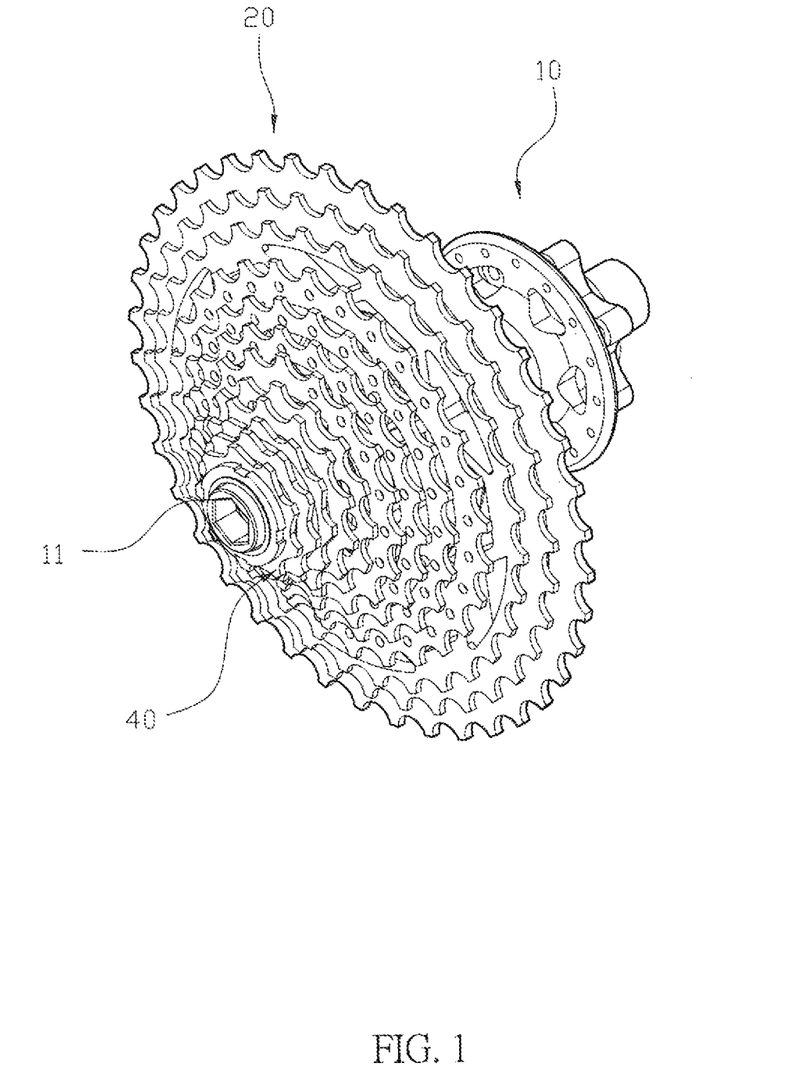
FIG. 1 is a three-dimensional view of the bicycle hub and flywheel structure in the present invention.
Figure 2:
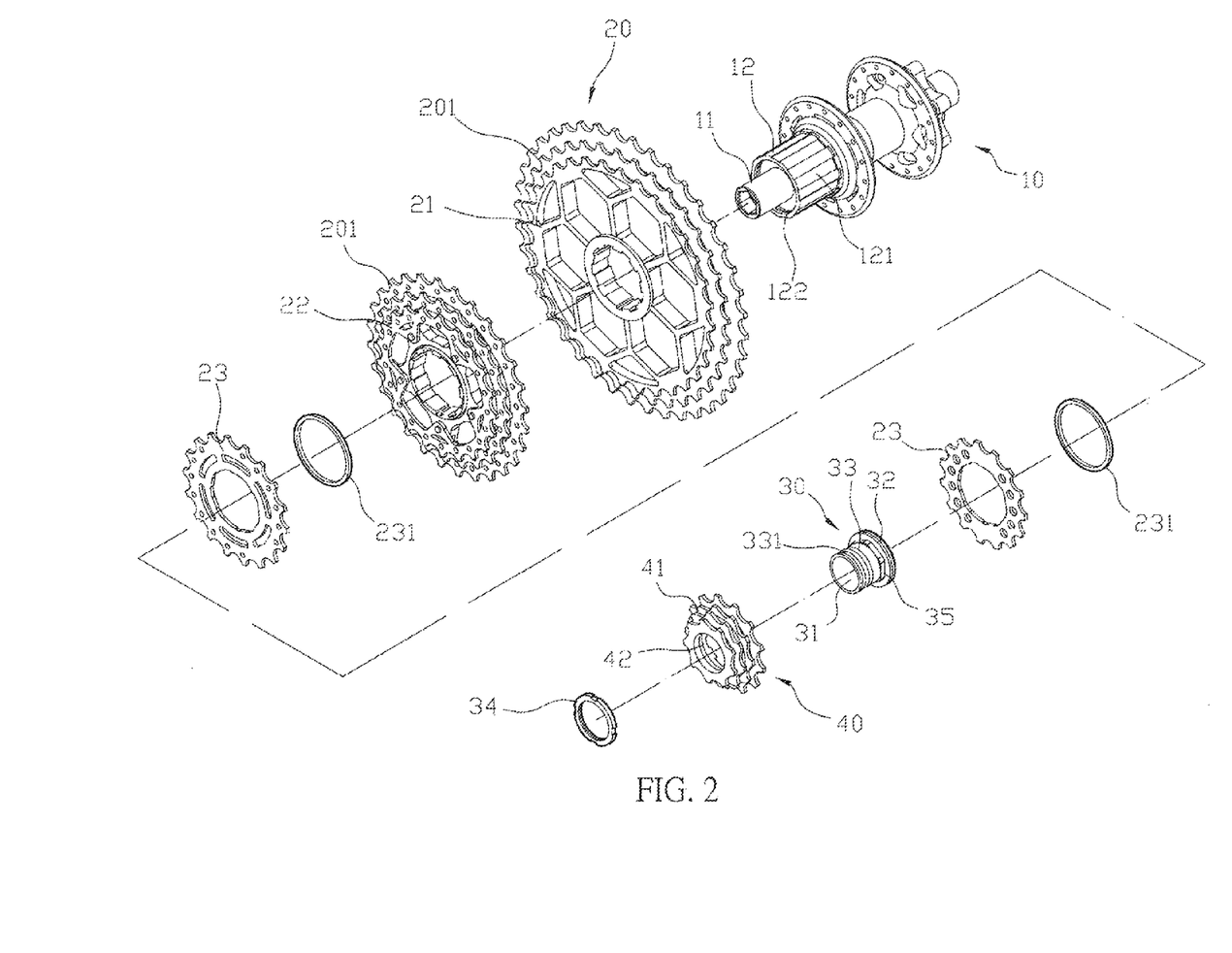
FIG. 2 is a exploded view of the bicycle hub and flywheel structure in the present invention.
Figure 3:
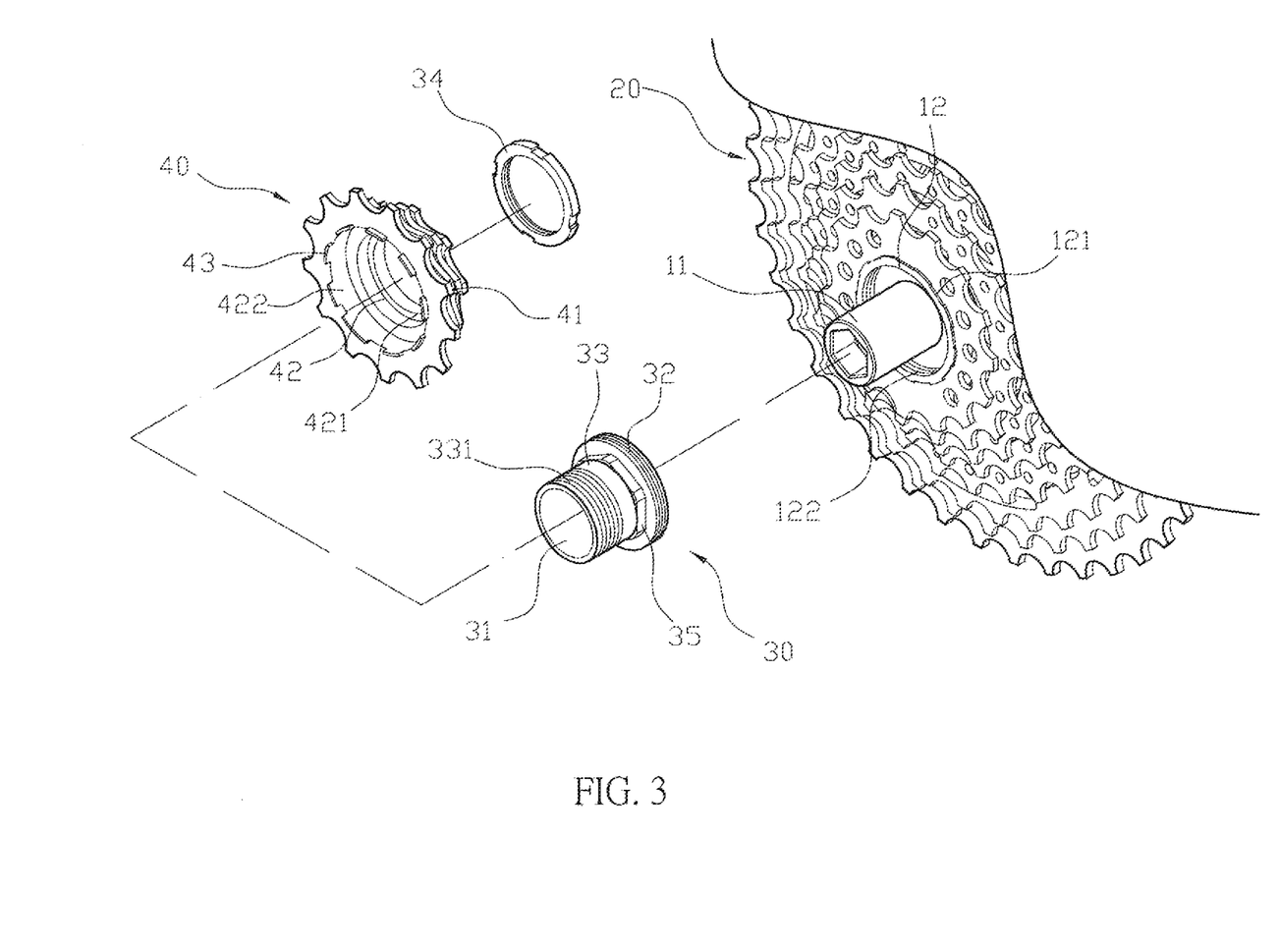
FIG. 3 is exploded views of the connecting sleeve, the external freewheel unit and the hub body in the present invention.
Figure 4:
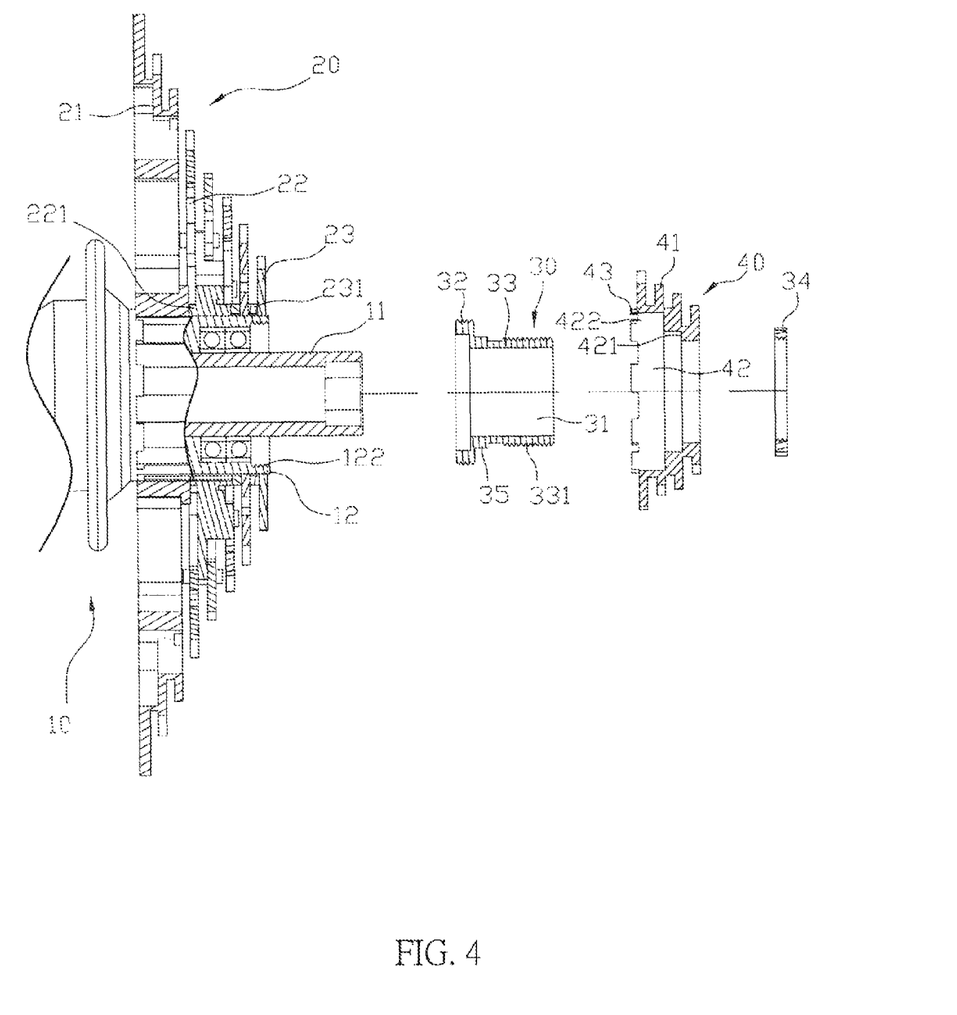
FIG. 4 is sectional, exploded views of the connecting sleeve, the external freewheel unit and the hub body in the present invention.
Figure 5:
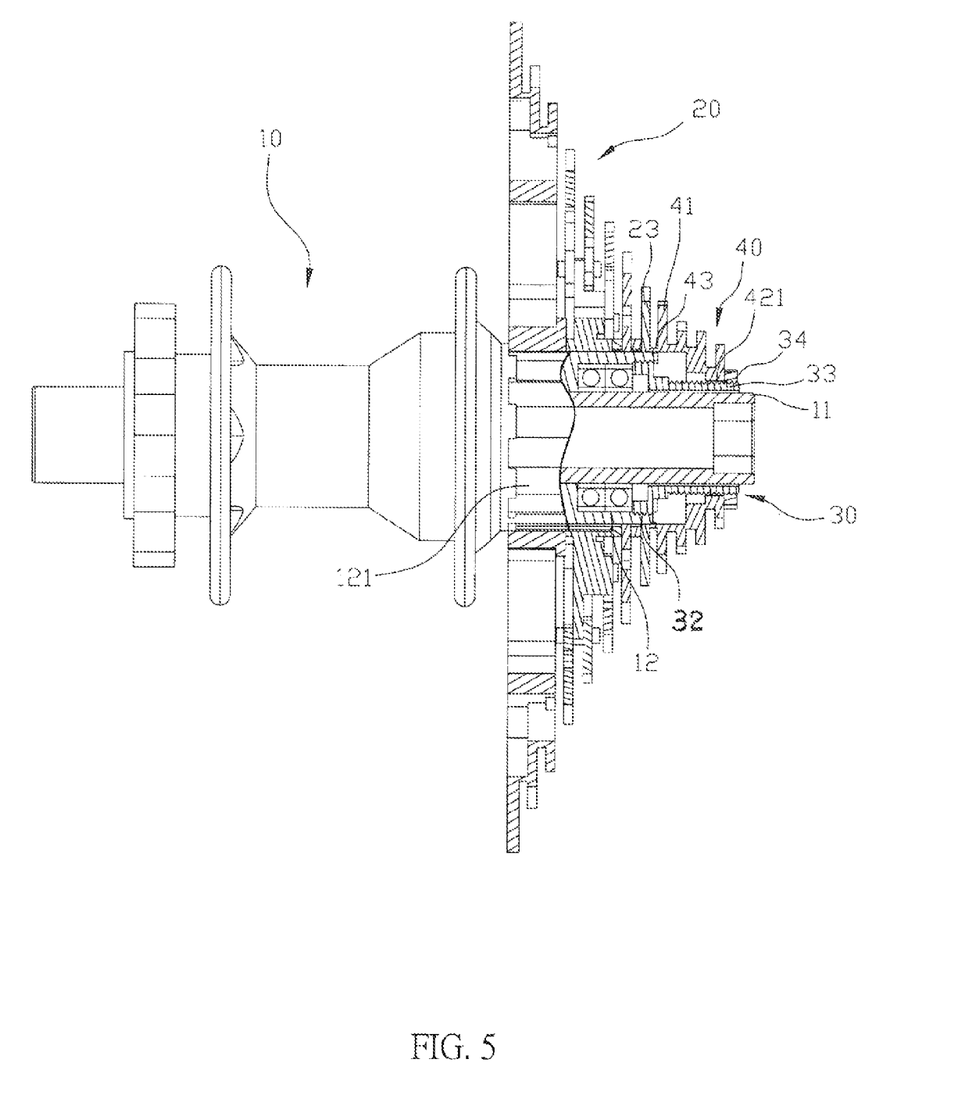
FIG. 5 is schematic exploded views of the connecting sleeve, the external freewheel unit and the hub body in the present invention.
Figure 6:
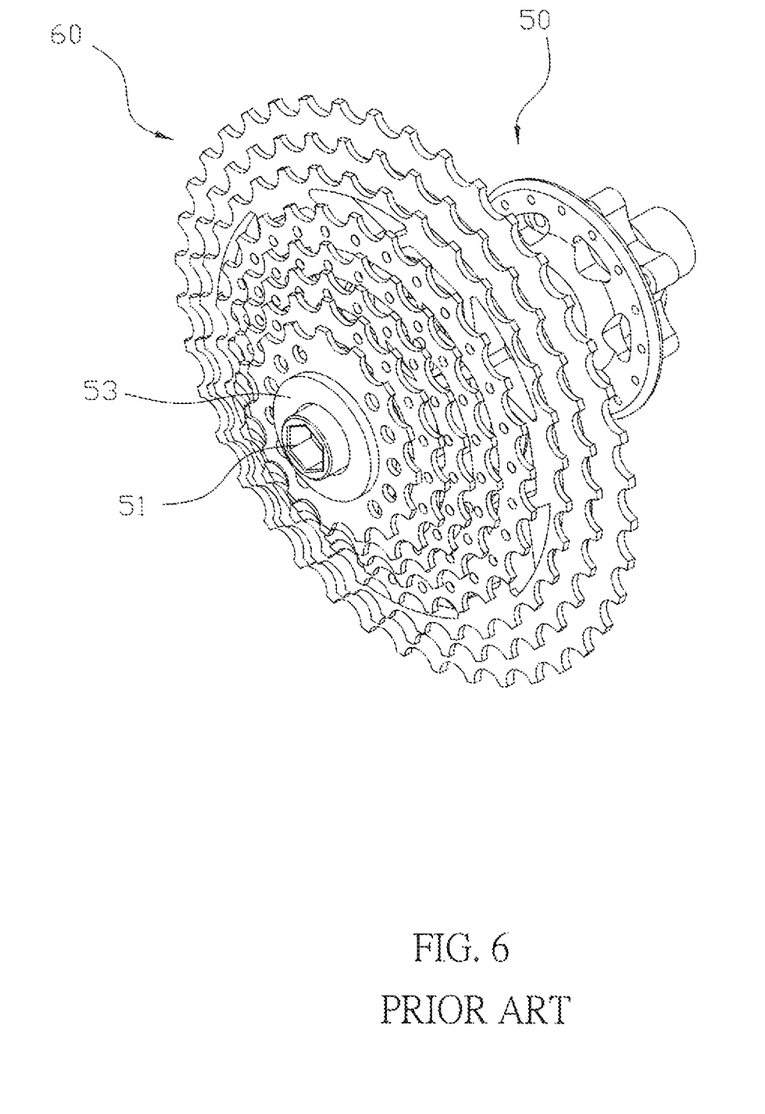
FIG. 6 is a prior art.

In order to further understand the goal, characteristics and effect of the present invention, a number of embodiments along with the drawings are illustrated as following:

Referring to FIGS. 1 to 3, the present invention provides an enhanced bicycle hub apparatus, which comprises a hub body (10), a freewheel unit (20), a connecting sleeve (30) and an external freewheel (40). The hub body (10) comprises a shaft (11), and a ratchet sleeve (12) mounted on the shaft (11) to secure the freewheel unit (20). The hub body (10) is used for bicycles travelling downhill, and a diameter of the shaft (11) is up to twelve millimeter. A plurality of axial connecting grooves (121) are formed on an outer periphery of the ratchet sleeve (12), and an inner threaded segment (122) is formed on an inner periphery thereof. The freewheel unit (20) formed integrally comprises a plurality of sprockets (201) disposed in a descending order of size, and a predetermined interval is formed between the sprockets (201). In one embodiment, the freewheel unit (20) comprises a first freewheel (21) and a second freewheel (22), and each of the two freewheels (21)(22) comprises a plurality of sprockets (201) in a descending order of size, and a predetermined interval is formed between the sprockets (201). The first freewheel (21) and the second freewheel (22) are mounted on the ratchet sleeve (12) of the hub body (10) sequentially, and a plurality of protruding ribs (221) are formed between the first freewheel (21) and the second freewheel (22) (as shown in FIG. 4). At least one connecting sprocket (23) serves as an extension of the freewheel unit (20), and an outer diameter of the connecting sprocket (23) is in a descending order of size continuing from the freewheel unit (20). A spacer (231) is mounted between the connecting sprocket (23) and the freewheel unit (20). The connecting sleeve (30) having a first through hole (31) for penetration is mounted on the shaft (11), and a connecting portion (32) comprising a threaded segment at one end thereof is engaged with the ratchet sleeve (12). A through portion (33) is formed beside the connecting portion (32), and an outer diameter thereof is smaller than the connecting portion (32), and the through portion (33) has an outer threaded segment (331) formed on an outer periphery thereof so it can be fastened by a nut (34). A locking portion (35) is formed between the through portion (33) and the connecting portion (32), and an outer periphery thereof is shaped into a noncircular surface for fastening by a common tool. An external freewheel unit (40) comprises a plurality of external sprockets (41) in descending order of size, and a second through hole (42) formed on a central portion thereof is mounted on the connecting sleeve (30). Two ends of the second through hole (42) are shaped into spiraling shapes inwards, and an engaging portion (421) is formed at one end, and a conjugating portion (422) is formed at the other end. The engaging portion (421) is engaged with the through portion (33) of the connecting sleeve (30), and an inner diameter of the conjugating portion (422) is slightly larger than an outer diameter of the ratchet sleeve (12). The largest sprocket (41) of the external freewheel unit (40) is smaller than an outer diameter of the smallest sprocket of the freewheel unit (20), and a plurality of restricting ribs (43) are formed on a backside of the largest sprocket (41) corresponding to the connecting grooves (121) of the ratchet sleeve (12), and in one embodiment, the number of teeth on the smallest sprocket (41) of the external freewheel unit (40) is eight to nine.

In actual application, referring to FIGS. 2 to 5, the freewheel unit (20) mounted on the ratchet sleeve (12) of the hub body (10), and the position thereof is secured by the connecting grooves (121). The freewheel unit (20) comprises the first freewheel (21) and the second freewheel (22) having the sprockets (201) in descending order of size are mounted on the ratchet sleeve (12). And a plurality of protruding ribs (221) are formed between the first freewheel (21) and the second freewheel (22) for separating a space between the two freewheels (21) (22). After the two freewheels (21)(22) are mounted on the ratchet sleeve (12), at least one connecting sprocket (23) served as an extension of the freewheel unit (20) is mounted thereon while the ratchet sleeve (12) still has space for the external sprockets (41) in order to provide a wider range of pedaling speeds, and the outer diameters of the sprockets (201) on the two freewheels (21)(22) and the connecting sprocket (23) are in descending order of size. The first through hole (31) of the connecting sleeve (30) is engaged with the shaft (11), and the connecting portion (32) thereof is engaged with the inner threaded segment (122) on the shaft (11) for rotating simultaneously. Especially for the hub body (10) of a downhill bicycle, the ratchet sleeve (12) is extended by connecting with the connecting sleeve (30) in order to increase the space for the external freewheel unit (40). The second through hole (42) of the engaging portion (421) on the external freewheel unit (40) is engaged with the through portion (33) of the connecting sleeve (30). The conjugating portion (422) is adjacent to the minimum sprocket (201) or the connecting sprocket (23) of the freewheel unit (20), and the restricting rib (43) thereof engaged with connecting grooves (121) of the ratchet sleeve (12) for rotating simultaneously bears against the outer wall of the minimum sprocket (201) or the connecting sprocket (23) of the freewheel unit (20) for separating a space, and the nut (34) is fastened on the outer threaded segment (331) on the connecting sleeve (30) to fix the positions of the freewheels. In one embodiment, the total number of the sprockets from the freewheel unit (20) and the external freewheel unit (40) is up to twelve pieces.

Moreover, the connecting sleeve (30) is also suitable for other hub bodies (10) on the market, by engaging the connecting portion (32) thereof with the inner threaded segment (122) on the ratchet sleeve (12), the ratchet sleeve (12) is extended in order to load the external freewheel unit (40). In one embodiment, a prior freewheel on the hub body (10) is disengaged firstly, and the freewheel unit (20) and the external freewheel unit (40) is mounted on the hub body (10) in sequence to achieve the sprockets thereon are in descending order of size in order to provide a wider range of pedaling speeds.

Comparing with conventional bicycle hub apparatus, the present invention is advantageous because: (i) the connecting sleeve (30) connects to the ratchet sleeve (12) of the hub body (10) in order to provide more space for the external freewheel (40), and is suitable for most hub bodies (10) on the market. By co-ordination of the freewheel unit (20) and the external freewheel unit (40), the sprockets (201) (23) can provide the wide range of pedaling speeds, and the assembly and disassembly process of the freewheel unit (20) and the external freewheel unit (40) are easy and fast; and (ii) by the design of the connecting sleeve (30) and the external freewheel unit (40), the hub body (10) loaded with more smaller freewheels provides more pedaling speeds for a downhill bicycle. The number of the smaller sprockets is increased, and the number of teeth on minimum sprocket is decreased while the sprocket becomes smaller. When cycling downhill, by using the smaller diameters of the sprockets, the smaller sprockets (41) of the external freewheel (40) can help a cyclist to maintain an optimum pedaling speed in slopy terrain, and the speed of the bicycle is easy to control when the slope of the terrain increases, so the risk of bicycle chain falling off is reduced.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A bicycle hub and flywheel structure comprising:
   a hub body comprising a shaft, and a ratchet sleeve mounted on the shaft to secure a freewheel unit, and a plurality of connecting grooves axially formed on an outer periphery of the ratchet sleeve, and an inner threaded segment formed on an inner periphery of the ratchet sleeve;
   a connecting sleeve having a first through hole for the shaft to insert, and a connecting portion comprising a threaded segment at one end thereof engaged with the ratchet sleeve; a through portion extending from the connecting portion having an outer diameter smaller than the connecting portion, and an outer threaded segment formed on an outer periphery of the through portion for a nut; and
   an external freewheel unit comprising a plurality of sprockets disposed in a descending order of size; a second through hole formed on a central portion of the external freewheel to connect with the through portion of the connecting sleeve; an outer diameter of the largest sprocket of the external freewheel unit being smaller than an outer diameter of the smallest sprocket of the freewheel unit, and a plurality of restricting ribs formed on a backside of the largest sprocket corresponding to the connecting grooves of the ratchet sleeve.

2. The bicycle hub apparatus of claim 1, wherein the freewheel unit comprises a plurality of sprockets disposed in a descending order of size, and a predetermined interval is formed between the sprockets.

3. The bicycle hub apparatus of claim 1, wherein the freewheel unit comprises a first freewheel and a second freewheel, and each of the first and second freewheels comprises a plurality sprockets in a descending order of size, and a predetermined interval is formed between the sprockets, and the first freewheel and the second freewheel are mounted on the ratchet sleeve of the hub body sequentially, and a plurality of protruding ribs are formed between the first freewheel and the second freewheel.

4. The bicycle hub apparatus of claim 1, wherein the flywheel unit has at least one connecting sprocket serving as an extension of the freewheel unit, and outer diameters of sprockets are in descending order of size, and a spacer is mounted between the connecting sprocket and the freewheel unit.

5. The bicycle hub apparatus of claim 1, wherein a non-circular locking portion is formed between the through portion and the connecting portion.

6. The bicycle hub apparatus of claim 1, wherein the number of teeth on the smallest sprocket of the external freewheel unit is eight.

7. The bicycle hub apparatus of claim 1, wherein the number of teeth on the smallest sprocket of the external freewheel unit is nine.

8. The bicycle hub apparatus of claim 1, wherein the total number of sprockets between the freewheel unit and the external freewheel unit is up to twelve pieces.

* * * * *